United States Patent [19]

Kinoshita

[11] 4,079,318

[45] Mar. 14, 1978

[54] SPACE DIVERSITY RECEIVING SYSTEM WITH PHASE-CONTROLLED SIGNAL COMBINING AT INTERMEDIATE FREQUENCY STAGE

[75] Inventor: Kyo Kinoshita, Tokyo, Japan

[73] Assignee: Nippon Electric Company, Ltd., Tokyo, Japan

[21] Appl. No.: 698,639

[22] Filed: Jun. 22, 1976

[30] Foreign Application Priority Data

Jun. 23, 1975 Japan .................................. 50-75470
Nov. 13, 1975 Japan ................................ 50-136724

[51] Int. Cl.² ........................................ H04B 7/08
[52] U.S. Cl. ...................................... 325/305; 325/56; 325/367; 325/369
[58] Field of Search ................. 325/56, 301, 303–306, 325/366, 367, 369, 476; 343/205

[56] References Cited

U.S. PATENT DOCUMENTS

| | | |
|---|---|---|
| 2,505,266 | 4/1950 | Villem ..................................... 325/56 |
| 3,430,156 | 2/1969 | Katzin ..................................... 325/56 |
| 3,528,012 | 9/1970 | Kahn ....................................... 325/305 |
| 3,735,266 | 5/1973 | Amitay .................................... 325/56 |
| 3,864,633 | 2/1975 | Strenglein .............................. 325/56 |

*Primary Examiner*—Robert L. Griffin
*Assistant Examiner*—Marc E. Bookbinder
*Attorney, Agent, or Firm*—Sughrue, Rothwell, Mion, Zinn and Macpeak

[57] ABSTRACT

A space diversity receiving system is described which eliminates the low frequency phase modulation component at the intermediate frequency stage output. Received signals from two antennae are converted to intermediate frequency signals and then combined after one signal has been passed through a variable phase shifter. Branching amplifiers are provided in each intermediate frequency channel so that all phase modulation, phase detection and production of the control signal necessary for controlling the variable phase shifter are achieved outside of all main intermediate frequency channels that are to be combined to obtain an intermediate frequency output.

9 Claims, 8 Drawing Figures

SPACE DIVERSITY RECEIVING SYSTEM WITH PHASE-CONTROLLED SIGNAL COMBINING AT INTERMEDIATE FREQUENCY STAGE

BACKGROUND OF THE INVENTION

The present invention relates to a space diversity receiving system in which carrier waves received by a plurality of antennas are combined under in-phase state at an intermediate frequency stage, and more particularly to a space diversity receiving system wherein all phase detection is performed outside of the main intermediate frequency channels, thereby eliminating low frequency phase modulation components from the combined intermediate frequency output.

Generally, to reduce the effects of fading and thereby to assure highly reliable communication, a space diversity receiving system is employed in a microwave communication system, in which a single transmitted electromagnetic wave is received by two or more antennas to allow the received carrier waves to be combined under in-phase state. Phase control means is needed to achieve the in-phase relationship among the received carrier waves. This phase control means is provided generally at a high frequency stage or at an intermediate frequency stage prior to the demodulation into a baseband signal. The phase control at high frequency stage has been in broader use, because of the simplicity in its construction. In the high frequency phase-controlled combination system, frequency-modulated or phase-modulated carrier waves received, for instance, by a first antenna and a second antenna are respectively band-filtered and, if necessary, amplified at a high frequency stage. After one of them has been phase-modulated by a low frequency signal and the other has been passed through a variable phase-shifter, they are both applied to a combiner to be combined. The output of the combiner is converted into an intermediate frequency signal by a frequency converter with a local oscillation applied to it. After amplification at an intermediate frequency pre-amplifier, the signal is applied to a main intermediate frequency amplifier having an automatic gain control circuit. From the output of the main intermediate frequency amplifier is obtained an output having a constant amplitude. Since the carrier wave received by one antenna is phase-modulated at the phase-modulator with the output of the low frequency oscillator, its phase difference from the phase of the carrier wave received by the other antenna results in a low frequency amplitude modulation component corresponding thereto appearing at the output of the main intermediate frequency amplifier. By controlling the amount of phase-shift of the above-mentioned variable phase-shifter in response to this low frequency component, the two received carrier waves are brought to an in-phase state at the input of the combiner.

However, in such a phase-controlled combining system, the fact that one of the received carrier waves in phase-modulated with a low frequency signal causes a low frequency phase-modulated component to be contained in the output of the combiner. Consequently, the frequency bandwidth allowed for the base band signal is limited, with the lower frequency region rendered useless. The recent trend toward the utilization of broadband transmission systems handling not only the multiplexed telephone signals, television signals and data signals, but also the command and/or control signals in the relay system has increased the need for the lower frequency region. However, the mere application of the above-described phase-controlled combination system to such transmission systems would result not only in the degradation of a signal-to-noise ratio of the baseband signal but also in the deterioration in the quality of other additional signals, because of the cross-modulation distortion caused by the low frequency phase modulation component.

SUMMARY OF THE INVENTION

One object of the present invention is to provide a space diversity receiving system in which a plurality of antenna outputs are combined at an intermediate frequency stage so that phase-modulated components caused by the low frequency signal employed for the detection of phase differences may not appear in the combined output.

According to one embodiment of the present invention there is provided a space diversity receiving system adapted to combine the plural antenna outputs at an intermediate frequency stage, comprising means for converting two received signals to intermediate frequency signals, means for shifting the output phase of either one of the two intermediate frequency signals, first combiner means for combining the output of said phase shift means and the non-phase-shifted intermediate frequency signal, first branching means for branching the output from said phase-shift means into first and second phase-shifted outputs second branching means for branching the non-phase-shifted intermediate frequency signal into first and second non-phase-shifted outputs, first combining means for combining one phase-shifted output and one non-phase-shifted output, means for phase-modulating either one of the remaining two outputs with a low frequency signal, second combiner means for combining the output of said phase-modulating means and the remaining unmodulated branching means output, and means for controlling the amount of phase shift of said phase-shift means in response to the output of said second combiner means.

BRIEF DESCRIPTION OF THE DRAWINGS

The above-mentioned and other features and objects of this invention will become more apparent by reference to the following description taken in conjunction with the accompanying drawings, in which:

FIGS. 3b and 3c show the operational characteristics of the phase shifter shown in FIG. 3a;

FIG. 4b shows waveforms illustrating the operation of the control signal generator shown in FIG. 4a;

DESCRIPTION OF THE PREFERRED EMBODIMENTS

Figure 1:
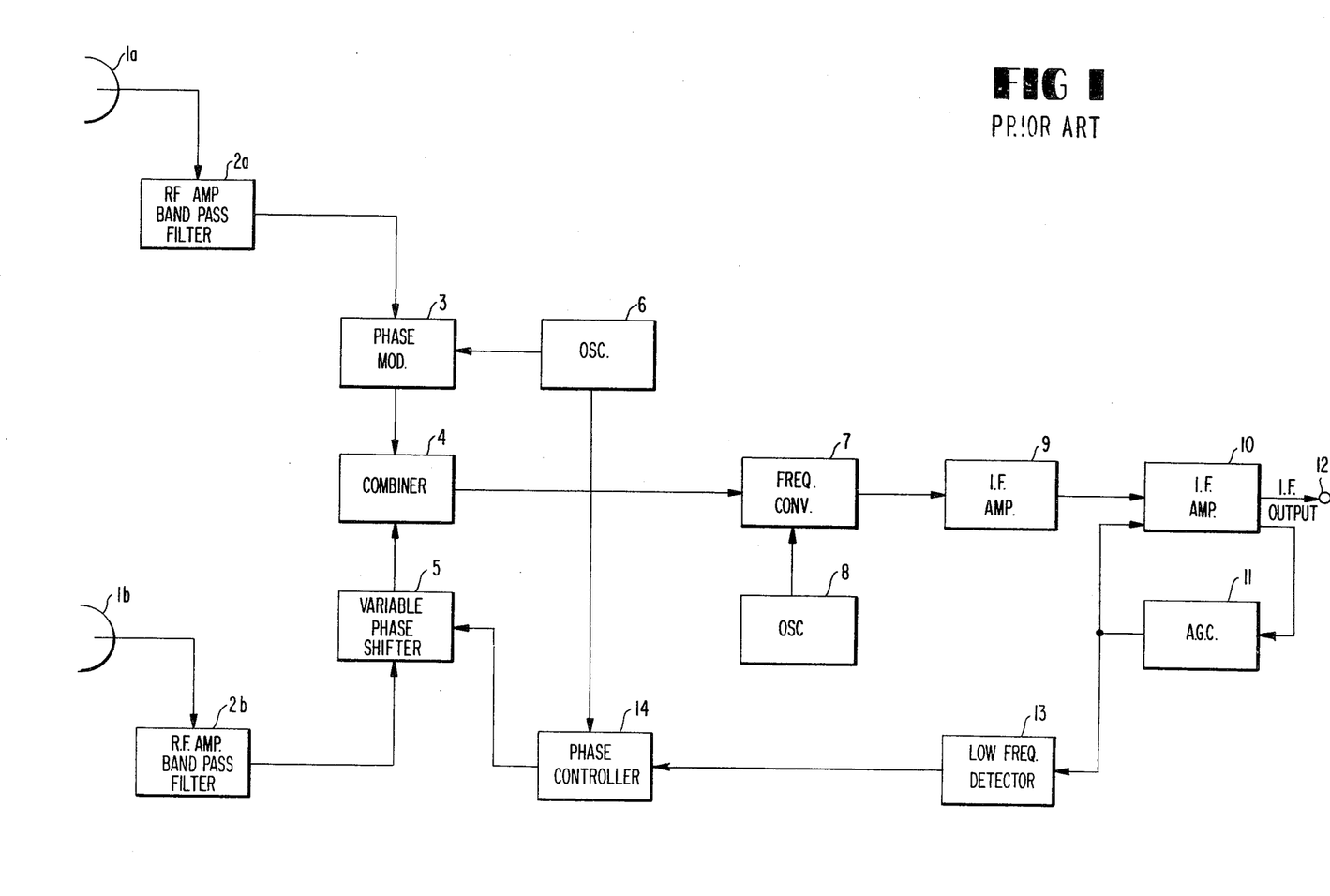
FIG. 1 is a block diagram showing one example of the conventional space diversity receiving system.

A conventional space diversity receiving system will be explained first with reference to FIG. 1. In this figure, reference numerals 1a and 1b designate antennas; 2a and 2b, high frequency stages including band-pass filters; 3, a phase-modulator; 4, a combiner; 5, a variable phase shifter; 6, a low frequency oscillator; 7, a frequency converter; 8, a local oscillator; 9, an intermediate frequency amplifier; 10, a main intermediate frequency amplifier; 11, an automatic gain control circuit; 12, an intermediate frequency output terminal; 13, a low frequency detector; and 14, a phase controller.

In operation, two carrier waves frequency-modulated or phase-modulated with the same information and received with the antennas 1a and 1b, are selected and, if necessary, amplified in the high frequency stages 2a and 2b, respectively. One of them is then fed through a phase-modulator 3 to a combiner 4, while the other is fed through a phase-shifter 5 to the combiner 4. The output of the combiner 4 is converted into an intermediate frequency signal in a frequency converter 7 by a output of the local oscillator 8. Then the intermediate frequency signal is fed through an intermediate frequency amplifier 9 to a main intermediate frequency amplifier 10 associated with an automatic gain control circuit 11. Since this amplifier 10 is gain-controlled by the automatic gain control circuit 11, an intermediate frequency output having a constant amplitude is obtained at the output terminal 12. Since a first carrier wave received by the antenna 1a is combined with a second carrier wave fed from the phase-shifter 5 after said first carrier wave has been subjected to phase-modulation at the phase-modulator 3 with the output of the low frequency oscillator 6, any phase difference between the two carrier waves at the respective inputs of the combiner 4 will cause a low frequency amplitude modulation component to appear at the output of said combiner 4. The combined signal together with this amplitude modulation component are led to the main intermediate frequency amplifier 10 in the intermediate frequency stage. In the automatic gain control circuit 11, the amplitude modulation component is detected and its detected output is fed back to the input of the main intermediate frequency amplifier 10. On the other hand, a part of the output is fed to the low frequency detector 13 which is designed to amplify only a low frequency component after removing a D.C. component from the output of the automatic gain control circuit 11. The amplified low frequency output is applied to the phase controller 14 which may be composed of a two-phase servo motor, the shaft of the servo motor being rotationally driven by applying the output of the low frequency oscillator 6 to its excitation coil and the output of the low frequency detector 13 to its control coil. The shaft of the servo motor is coupled via appropriate reduction gear means to driving means of the phase-shifter 5 which has a dielectric rotary plate for shifting the phase of an electromagnetic wave within a waveguide. The rotary shaft of the servo motor is rotated in response to the magnitude of the low frequency signal applied to the control coil, changing the amount of phase-shift of the phase-shifter 5 in the direction for reducing the low frequency component. In this way the combiner 4 can combine the two carrier waves applied thereto in an in-phase relationship. According to the above-described system, correction control for a phase difference between two received carrier waves can be achieved at a high sensitivity by phase-modulating one of the received carrier waves with a low frequency signal. However, in the combined output of the combiner 4 are contained a fundamental wave and its higher harmonics of the low frequency phase modulation component. Such components cannot be removed at any phase relationship between the two input carrier waves. Therefore, at the output of the main intermediate frequency amplifier 10 is derived an intermediate frequency output that is phase-modulated with the low frequency in addition to the modulation with information. Since this low frequency modulation component causes cross-modulation distortion of the informational transmission signals, the lower limit in the baseband width cannot be extended up the proximity of this low frequency. Such restriction to the band width is a fatal shortcoming for transmission of multiplexed telephone, television and other auxiliary signals.

Now one preferred embodiment of the present invention for a space diversity receiving system combining phase-controlled carrier waves in the intermediate frequency band will be described with reference to FIG. 2. The respective carrier waves received by the two antennas 101a and 101b for space diversity reception are selected and amplified in the high frequency stages 102a and 102b, and then fed to the frequency converters 103a and 103b, respectively. A local oscillation signal from the local oscillator 104 is applied to the frequency converters and their respective outputs are then fed to the intermediate frequency amplifiers 105a and 105b, respectively. One of the two amplified intermediate frequency signals, in the illustrated case the output of the intermediate frequency amplifier 105b is passed through a variable phase-shifter 106 to a branching amplifier 107b. In this case, the output of the intermediate frequency amplifier 105a is directly passed to a branching amplifier 107a. In the branching amplifiers 107a and 107b, each of the intermediate frequency signals is amplified and branched into two outputs. Among these intermediate frequency outputs, one output of the branching amplifier 107a is fed to a combiner 109 through an absolute delay time equalizer 108 in which a phase shifter is included if necessary. In addition, one output of the branching amplifier 107b is directly fed to the combiner 109 the output of which is then applied to a main intermediate frequency amplifier 110 associated with an automatic gain control circuit 111. The main intermediate frequency amplifier 110 delivers an intermediate frequency output, having its amplitude controlled at a constant value, at an output terminal 112.

The other branched output of the branching amplifier 107a is applied to a phase-modulator 114 through an intermediate frequency amplifier 113 associated with an automatic gain control circuit or an amplitude limiter. After being phase-modulated with a low frequency signal supplied from a low frequency oscillator 115, it is applied to a combiner 116. The other branched output of the branching amplifier 107b is also applied to the combiner 116 through an intermediate frequency amplifier 117, similar to amplifier 113, associated with an automatic gain control circuit or an amplitude limiter. The two amplitude limiters 113 and 117 are used for the purpose of eliminating the amplitude variation caused by the influence of fading of the received waves when the two intermediate frequency signals are combined by the combiner 116. In the combiner 116 the intermediate frequency signals at the respective inputs are combined and the output is fed to a low frequency detector 118 for extracting a low frequency amplitude modulation component. The low frequency output of the low frequency detector 118 is applied to a phase detector 119 where it is phase-detected with a reference output from the low frequency oscillator 115 and then fed to a control signal generator 120. In this control signal generator 120, a control signal of the type adapted for control of the variable phase-shifter, as described later, is generated. The amount of phase-shift in the variable phase-shifter 106 is controlled by the output of this control signal generator 120 so that the phase difference between the two intermediate frequency signals applied to the combiner 116 may be automatically reduced to zero.

When the phases of the two intermediate frequency signals are brought into coincidence at the inputs of the combiner 116 by the above-mentioned phase control, it is also necessary that the phases and the absolute delay times of the two intermediate frequency signals at the inputs of the combiner 109 should coincide with each other. For this reason, the absolute delay time equalizer 108, including a phase shifter if necessary is used to adjust the phase difference and delay time difference between the respective inputs of the combiner 109.

Figure 3A:
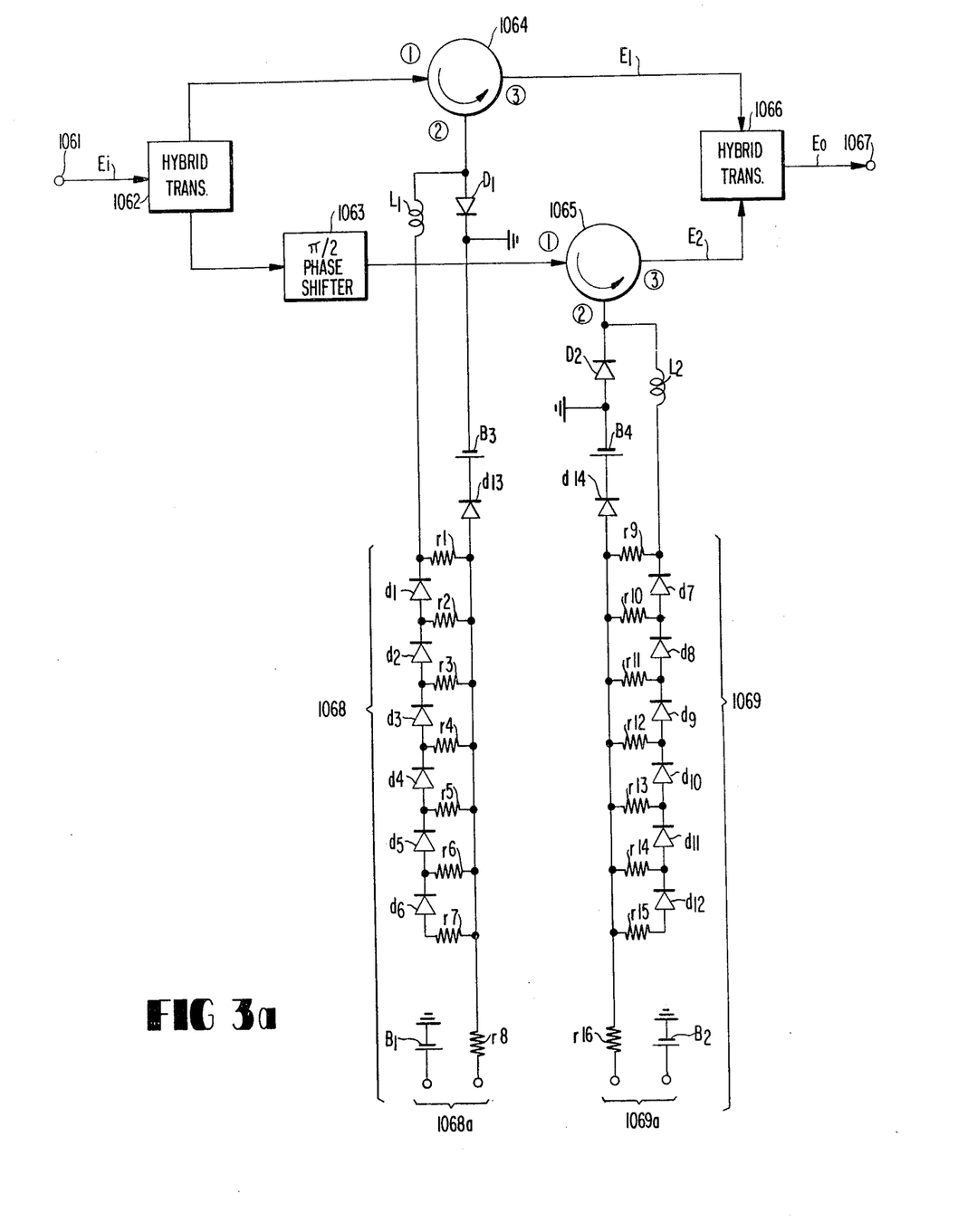
FIG. 3a, shows the detailed construction of one example of the phase-shifter used in the embodiment shown in FIG. 2.

Now one known example of the variable phase shifter 106 in the above-described embodiment will be described in more detail with reference to FIG. 3a. An intermediate frequency signal applied to an input terminal 1061 is branched into two outputs by means of a hybrid transformer 1062, and one output is directly applied to the first terminal of a 3-terminal circulator 1064, while the other output is applied to the first terminal of another 3-terminal circulator 1065 through a $\pi/2$ fixed phase-shifter 1063. The input signal applied to the first terminal of the circulator 1064 appears at its second terminal, and is applied to a diode $D_1$ which serves as a variable impedance element terminating this circuit. The circulator output applied to the diode $D_1$ is attenuated, reflected towards the second terminal of the circulator 1064 in accordance with a reflection coefficient determined by the resistance value of the diode $D_1$, and then derived from the third terminal of said circulator 1064. The input applied to the first terminal of the circulator 1065 undergoes a transformation similar to that described in circulator 1064 above. The respective outputs derived from the third terminals of the circulators 1064 and 1065 are combined in another hybrid transformer 1066, and led to an output terminal 1067. Here it is to be noted that the input-to-output attenuation ratios of the circulators 1064 and 1065 are proportional to the reflection coefficients determined by the resistance values of the diodes $D_1$ and $D_2$, respectively. Control signal currents having a phase difference of $\pi/2$ therebetween are passed through the diodes $D_1$ and $D_2$ to effect control in such a manner that the outputs $E_1$ and $E_2$ of the circulators 1064 and 1065, respectively, may have the following transmission characteristics:

$$E_1 = (Ei/2) k \sin \sigma \qquad (1)$$

$$E_2 = (Ei/2) k \cos \sigma \qquad (2)$$

Then the combined output $E_0$ of the hybrid transformer 1066 is represented as follows:

$$E_0 = (Ei/2) k (\sin \sigma + \cos \sigma) = (Ei/2) k \, e^{i\sigma} \qquad (3)$$

Where $Ei$ represents an input voltage to the hybrid transformer 1062; $k$, an attenuation coefficient of the circulators; and $\sigma$, a phase angle of the control signal. From Equation (3), it will be seen that the output signal $E_0$ of the hybrid transformer 1066 has a constant amplitude, and that the phase of the output signal can be shifted in proportion to the phase angle $\sigma$ of the control signal.

For the purpose of controlling the resistances of the diodes $D_1$ and $D_2$ for the circulators 1064 and 1065, triangular waves generated by converting a digital signal and phase-shifted by $\pi/2$ with respect to each other to an analog signal are applied to terminals 1068a and 1069a. These input signals drive the diodes $D_1$ and $D_2$ through control signal converter circuits 1068 and 1069, respectively. The characteristics of the triangular waves applied to the terminals 1068a and 1069a and the characteristics of driving current versus reflection coefficient of the diodes are not in such linear relationship that the output amplitudes from the circulators 1064 and 1065 may be varied as represented by Equations (1) and (2) above. The control signal converter circuit 1068 achieves the composite function transformation of converting a triangular wave into a sinusoidal wave and compensating for the non-linearity of driving current versus reflection coefficient of the diode and is composed of a ladder type network consisting of a plurality of diodes $d_1 \sim d_6$ and a plurality of resistors $r_1 \sim r_8$.

Figure 3B:
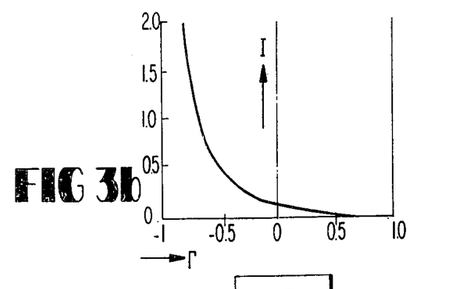

For example, if a PIN diode is employed as the diode $D_1$, the relationship between a forward current I and a reflection coefficient $\tau$ resulting from a dynamic resistance R for that current value is shown in FIG. 3b.

Figure 3C:
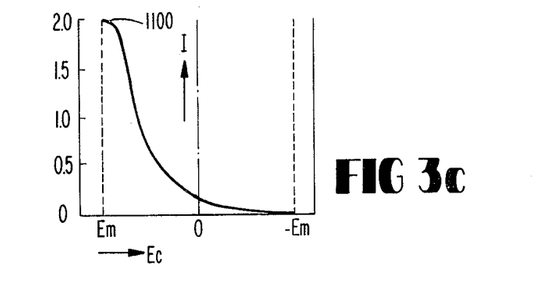

In addition, if the voltage of the control triangular wave applied to the control signal converter circuit 1068 is represented by $E_c$, then the following equation is obtained:

$$E_c = E_m (2\sigma/\pi) \qquad (4)$$

where $|\sigma| \leq \pi/2$ and $E_m$ represents the maximum value. Thus, the characteristics of the driving current I of diode $D_1$ as a function of the triangular wave input voltage $E_c$ for the control signal converter circuit, 1068 are shown in FIG. 3c. In the characteristic curve depicted in this figure, the upper left end part 1100, where the current saturates, is realized by limiting the current with the voltage of a power supply $B_3$ inserted on the cathode side of diode $d_{13}$. Reference character $L_1$ designates a choke for preventing a high frequency current from flowing into the control signal converter circuit 1068 from the second terminal of the circulator 1064. As seen from FIGS. 3a, 3b and 3c, the current passed through the diode $D_1$ is a forward current only, and so, a bias power supply $B_1$ for blocking a backward current is inserted on the input terminal side 1068a. A control signal converter circuit 1069 is similar in operation to the above-described circuit 1068.

Figure 4A:
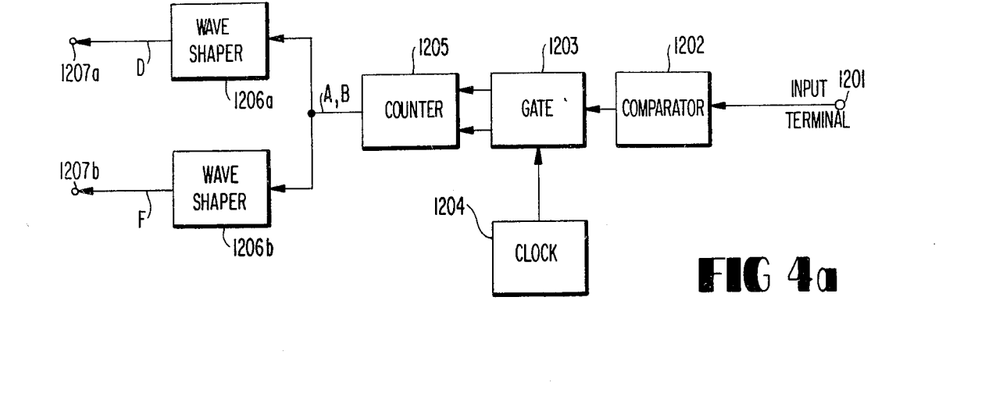
FIG. 4a is a block diagram of one example of the control signal generator circuit used in the embodiment shown in FIG. 2 and its operation characteristics.

One example of the control signal generator 120 shown in FIG. 2 for driving the above-described variable phase-shifter 106 will now be explained with reference to FIG. 4a. A low frequency phase-detected output from the phase detector 119 shown in FIG. 2 is applied to an input terminal 1201, the magnitude of said signal being varied in response to the phase difference between the two intermediate frequency signals to be combined by the combiner 116. The signal at the input terminal 1201 is applied to a comparator 1202 to be converted to a D.C. output having a fixed magnitude and a variable polarity that is varied depending upon whether the phase of the input signal is advanced or retarded with respect to the reference phase of the low frequency oscillator. The output of this comparator 1202 is applied to a gate circuit 1203 to be gated by pulses fed from a clock pulse generator 1204, so that pulses are emitted from the gate circuit 1203 through separate output paths depending upon the polarity of the input signal. These pulses of separate polarity groups are applied to a reversible counter 1205 to effect up-count or down-count depending upon the polarity of the input pulse, Wherein a repetitive saw-tooth wave having a predetermined period in response to reset pulses is formed. The saw-tooth wave is then branched into two outputs one of which is applied to a triangular wave shaping circuit 1206a consisting of a positive-complementary code selector circuit for a saw-tooth wave and a level shift circuit, wherein a triangular wave is formed which completes one cycle for every four input saw-tooth waveforms. The other of said branched outputs is applied to a triangular wave shaping circuit 1206b, wherein a triangular wave advanced by 90° in phase with respect to the signal produced by the triangular wave shaping circuit 1206a is produced by a function similar to that of said traingular wave shaping circuit 1206a. The two triangular waves are then fed to output terminals 1207a and 1207b, respectively.

Figure 4B:
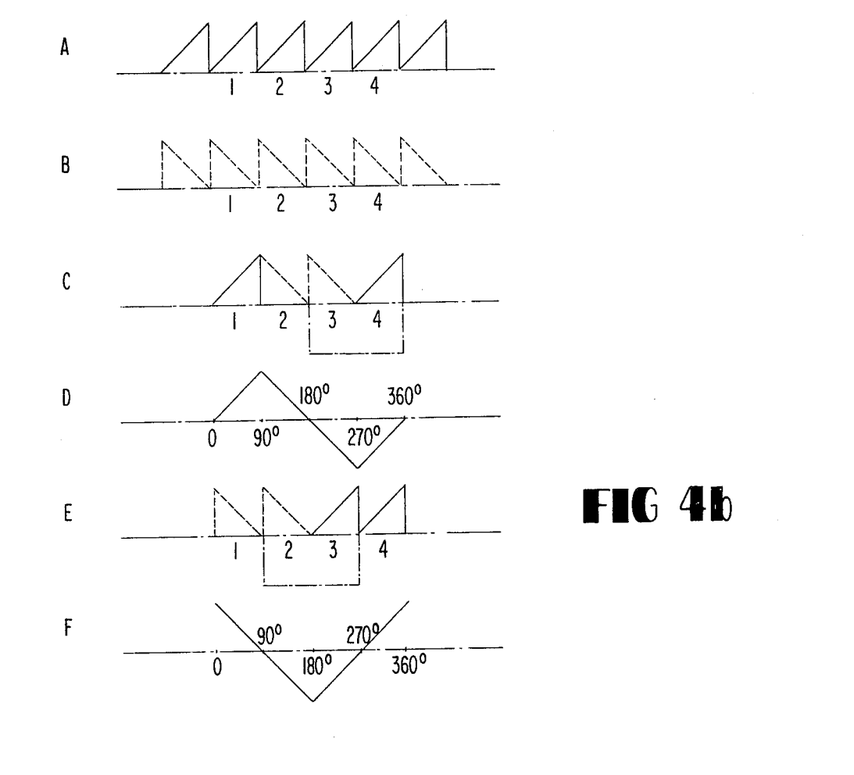

In order to further clarify the above-mentioned process of producing a triangular wave from a saw-tooth wave, an explanation will be given with reeference to FIG. 4b. Waveform A represents a saw-toth waveform at the output of the reversible counter 1205, which has been obtained by integrating counted positive input pulses and resetting at every predetermined number of clock pulses. Waveform B represents a saw-tooth wave obtained by a complementary code output in contrast to the positive code output of the waveform A. Waveform C represents the process of comfining four saw-tooth waveforms wherein a positive code output is selected for the first and fourth saw-tooth waveforms, a complementary code output is selected for the second and third saw-tooth waveforms, and the third and fourth saw-tooth waveforms are shifted in level. Through this process, a triangular waveform shown as waveform D can be obtained. Waveform E represents the process wherein a complementary code output is selected for the first and second waveforms, a positive code output is selected for the third and fourth waveforms, and the second and third saw-tooth waveforms are shifted in level. Through this process, a triangular waveform F, which is advanced by 90° in phase with respect to the waveform D, can be obtained. In contract to the control means in the prior art, operated mechanically as by a servo motor or the like, the above-described control signal generator consumes less power can be smaller in size and can also enhance the reliability of the entire system when used in combination with the above-described electric phase-shifter.

In the space diversity receiving system according to the present invention, wherein phase-controlled signals are comfined in the intermediate frequency band according, an unnecessary phase-modulation component would not appear in the combined intermediate frequency signal because a low frequency phase-modulator for phase control purpose is not inserted in either of the two main intermediate frequency circuits the signals from which are combined by the combiner 109 in order to obtain an intermediate frequency output. In addition, since the low frequency phase-modulator and the phase shifter for phase control purpose are both located after the intermediate frequency converter stage, the design of the space diversity system need not be changed for each chosen frequency in the high frequency stage, and therefore the apparatus can be easily standardized. The phase-shifter inserted into the main intermediate frequency circuit must be associated with a delay time equalizer or some other device for preventing degradation of the envelope delay time characteristics of the signal which may occur even within a broad transmission band width. For the purpose of practically effecting phase control of an intermediate frequency signal without being burdened by the design of the variable phase-shifter, a modified embodiment of the present invention as described hereunder, is more favorable.

Figure 5:
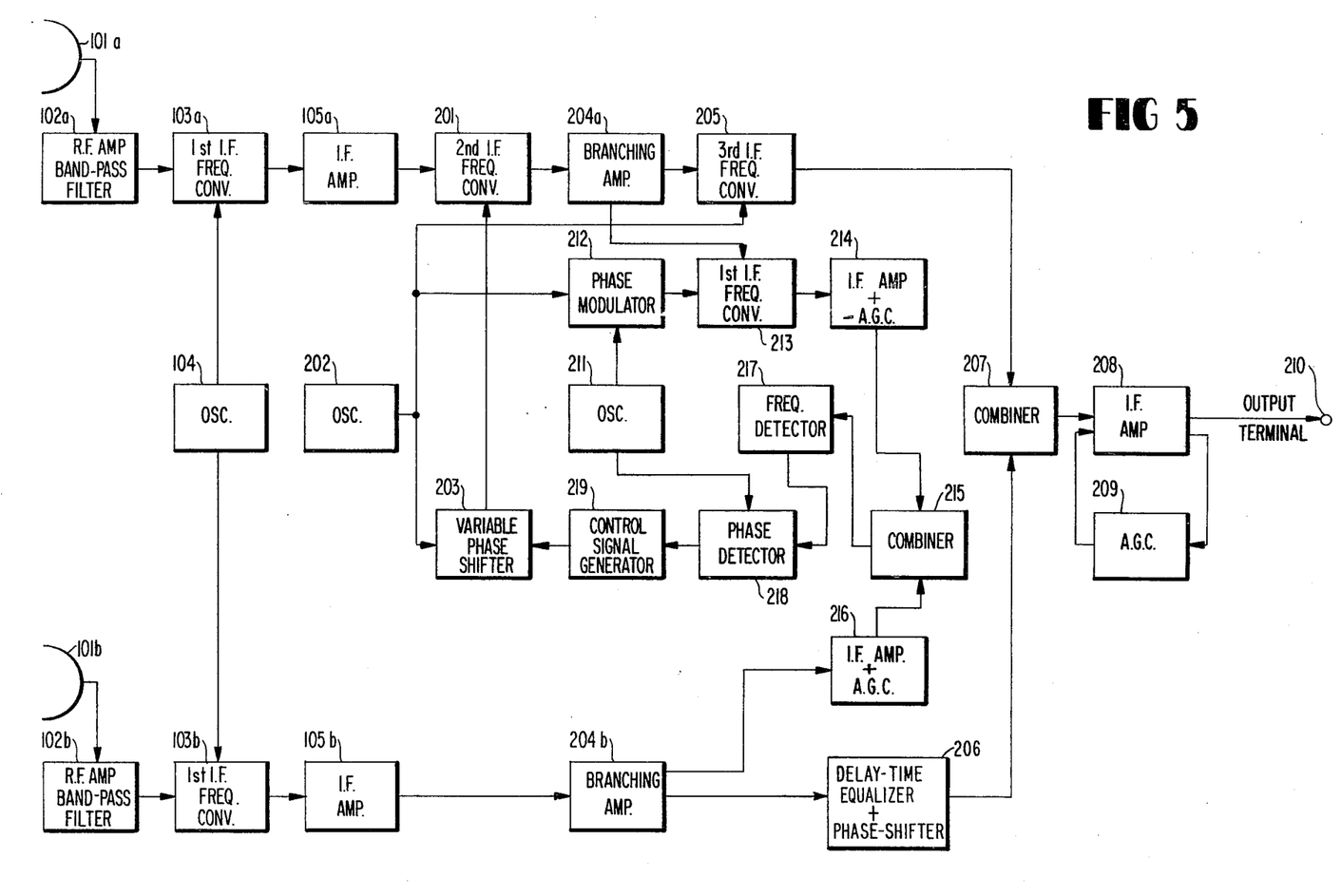
FIG. 5 is a block diagram showing another preferred embodiment of the present invention.

Referring now to FIG. 5, another preferred embodiment of the present invention will be explained which has the added advantage of achieving phase control of an intermediate frequency signal without being burdened by the design of the variable phase-shifter. Circuit components from antennas to intermediate frequency amplifiers which have the same functions as those of the corresponding circuit components in the embodiment shown in FIG. 2, are designated by like reference numerals. Two carrier waves for diversity reception received by antennas 101a and 101b are applied to first intermediate frequency converters 103a and 103b, respectively, through high frequency stages 102a and 102b including band-pass filters. A local oscillation signal from first local oscillator 104 is applied to both first intermediate frequency converters 103a and 103b, so that the received carrier waves fed from the high frequency stages 102a and 102b, respectively, are converted into first intermediate frequency signals. Said first intermediate frequency signals are amplified by intermediate frequency amplifiers 105a and 105b and thereafter one of them is applied to a second intermediate frequency converter 201. The other is applied to a branching amplifier 204b, through an absolute delay time equalizer (not shown), which may be provided if necessary, for eliminating the delay time difference between the respective intermediate frequency signals. One output of a second local oscillator 202 is applied to a second intermediate frequency converter 201 through a variable phase-shifter 203 for converting one of said first intermediate frequency signals into a second intermediate frequency signal. The converted second intermediate frequency signal is branched at a branching amplifier 204a, and one of the branched output is applied to a third intermediate frequency converter 205 wherein the second intermediate frequency signal is mixed with a part of the output of the second local oscillator 202, and thereby re-converted into the original first intermediate frequency. This re-converted output is fed to a first combiner 207 through a delay time equalizer 206, which may include a phase shifter if necessary to be combined with one output of branching amplifier 204b. This combined output is applied to a main intermediate frequency amplifier 208 associated with an automatic gain control circuit 209 thereby obtaining a constant amplitude intermediate frequency output at output terminal 210.

The other output of the second local oscillator 202 is applied to a phase-modulator 212, where it is phase-modulated with a low frequency signal fed from a low frequency oscillator 211. One output of the second intermediate frequency branching 204a and the output of said phase-modulator 212 are mixed in a fourth frequency converter 213 to be re-converted into the original first intermediate frequency. The output of frequency converter 213 and the second output of branching amplifier 204b are both fed into combiner 215 through amplifiers 214 and 215, respectively having automatic gain control circuits or amplitude limiters. After both intermediate frequency signals have been combined in the combiner 215, the combined output is applied to a low frequency detector 217 which serves to extract a low frequency amplitude-modulation component. The extracted low frequency output is then phase-detected in the phase detector 218 by a reference output from the low frequency oscillator 211, and is then applied to a control signal generator 219 such as that shown in FIG. 4a wherein a control signal is produced which controls the variable phase-shifter 203, which as that shown in FIG. 3, so that the phase difference between the two inputs of the combiner 215 is automatically adjusted to zero.

Figure 2:
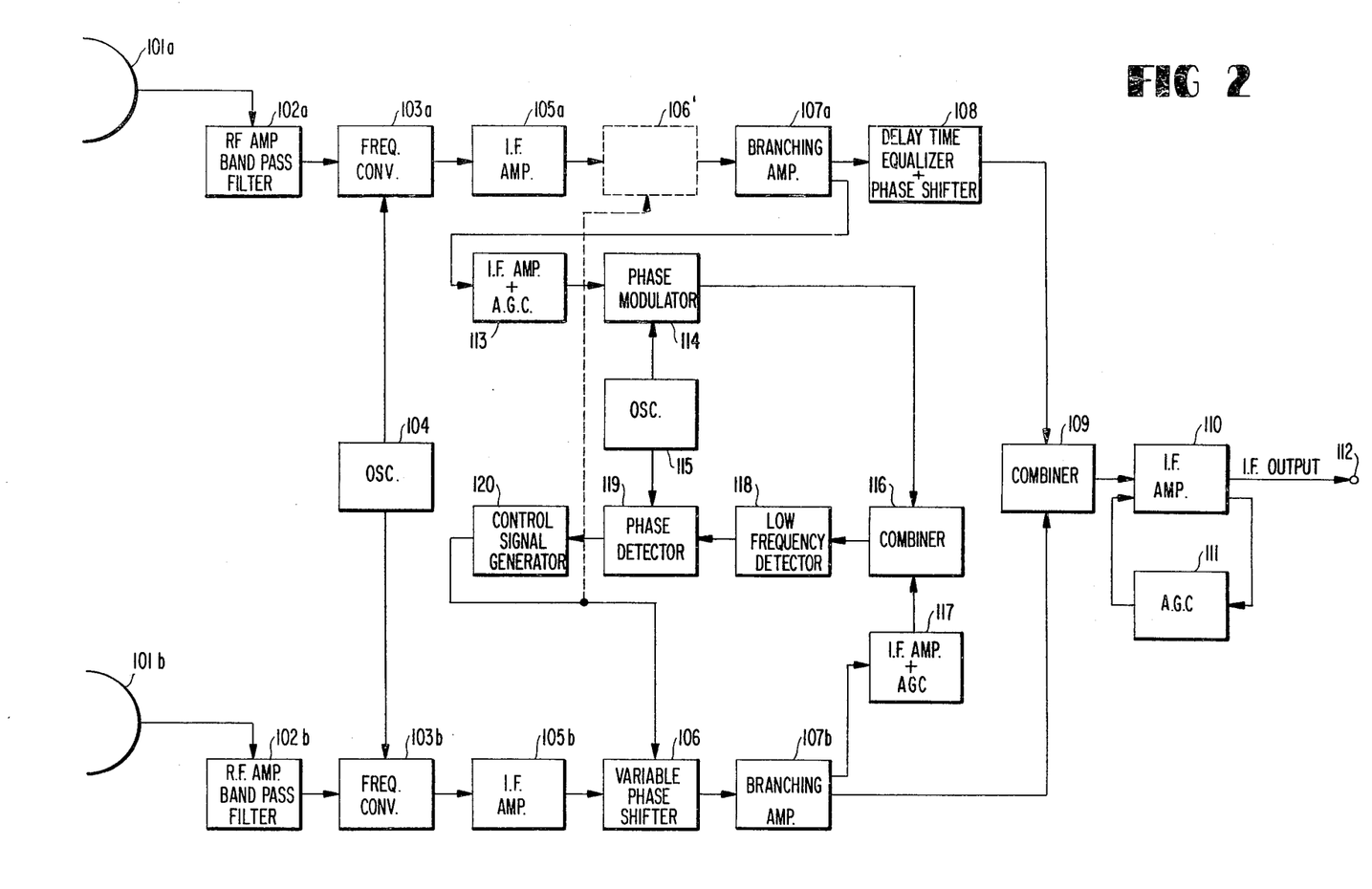
FIG. 2 is a block diagram showing one preferred embodiment of the space diversity receiving system according to the present invention.

It is to be noted that the amplitude limiters 214 and 216 are employed from the same reasons as the amplitude limiters 113 and 117 illustrated in FIG. 2, that is, for the purpose of eliminating an amplitude variation caused by the influence of fading upon the received waves, prior to combination. Further, the absolute delay time equalizer and phase shifters 206 is, as in the embodiment illustrated in FIG. 2, are for the purpose of eliminating a phase difference between the two intermediate frequency signals before feeding them into the combiner 207. In this modified embodiment, since the phase-shifter 203 for controlling the phase of the intermediate frequency signal is inserted on the local oscillator side of the frequency converter 201, degradation of envelope delay time characteristics would not occur over the broad transmission signal band. However, the construction of the system becomes more complex than the embodiment illustrated in FIG. 2 because of the greater number of intermediate frequency converters.

As pointed out above in the description of the to two preferred embodiments, of the present invention, the phase control for the intermediate frequency phase-controlled combination in a space diversity receiving system is achieved indirectly through branched circuits separate from the main intermediate frequency signal paths and therefore the phase-modulation component generated by the modulator to be used for detecting the phase difference will not appear in the combined intermediate frequency output. Consequently, even when the present invention is applied to a diversity receiver for broad band use, degradation of signal quality caused by cross-modulation distortion will not occur at all.

What is claimed is:

1. A diversity receiving system of the type wherein a plurality of received signals are combined in an in-phase relationship at an intermediate frequency, comprising:
    (a) at least first and second channels, each of said first and second channels including a first frequency conversion means for converting a respective one of said received signals to an intermediate frequency signal and branching means connected to receive the signal from said first frequency conversion means for providing first and second output signals, said first channel further including phase variation means connected between said first frequency conversion means and said branching means for altering the phase of the output intermediate frequency signal from said first frequency conversion means,
    (b) first combining means connected to receive the first output signals of the branching means in each of said at least first and second channels for providing a first combined output signal, and
    (c) phase variation control means for controlling said phase variation means in said first channel, said phase variation control means including phase detection means connected to receive the second output signals of the branching means in each of said at least first and second channels for detecting the phase difference between said second output signals, and control signal generator means connected to said phase detection means and responsive to the output of the phase detection means for generating a control signal to said phase variation means to cause the signals at the inputs of said first combining means to be in-phase, wherein said phase detection means comprises:
        (i) a phase modulator connected to receive the second output signal from the branching means in either of said at least first and second channels,
        (ii) second combining means for combining the remaining second output signals from the branching means in said at least first and second channels with the output of said phase modulator,
        (iii) a phase detector for providing an output signal to said control signal generator means, said phase detector being connected to receive the output of said second combining means, and
        (iv) an oscillator connected to provide oscillation frequency signals to said phase modulator to modulate its input signal and to said phase detector as a reference frequency to detect the modulating signal in the output of said second combining means.

2. A space diversity receiving system according to claim 1, wherein said second channel further includes delay equalizer means connected to receive the first output signal from said branching means for compensating for the delay time caused by said phase variation means in said first channel.

3. A space diversity receiving system according to claim 1, further comprising at least first and second automatic gain control amplifiers connected to receive the second output signals from the branching means in each of said at least first and second channels, respectively, for maintaining said second output signals at a constant amplitude.

4. A space diversity receiving system of the type wherein a plurality of received signals are combined in an in-phase relationship at an intermediate frequency, comprising:
    (a) at least first and second channels, each of said first and second channels including a first frequency conversion means for converting a respective one of said received signals to an intermediate frequency signal and branching means connected to receive the signal from said first frequency conversion means for providing first and second output signals, said first channel further including phase variation means connected between said first frequency conversion means and said branching means for altering the phase of the output intermediate frequency signal from said first frequency conversion means,
    (b) first combining means connected to receive the first output signals of the branching means in each of said at least first and second channels for providing a first combined output signal, and
    (c) phase variation control means for controlling said phase variation means in said first channel, said phase variation control means including phase detection means connected to receive the second output signals of the branching means in each of said at least first and second channels for detecting the phase difference between said second output signals, and control signal generator means connected to said phase detection means and responsive to the output of the phase detection means for generating a control signal to said phase variation means to cause the signals at the inputs of said first combining means to be in-phase, wherein said phase variation means in said first channel includes:

(i) a second frequency conversion means for converting the first intermediate frequency signal output from said first frequency conversion means to a second intermediate frequency signal, (ii) first oscillator means for providing a plurality of first oscillation frequency signals, (iii) a variable phase shifter connected to receive a first oscillation frequency signal from said first oscillator means, said variable phase shifter receiving a control signal from said control signal generator means and providing a frequency conversion signal to said second frequency conversion means, and (iv) third frequency conversion means, connected to receive the first output signal from said branching means, for converting a second intermediate frequency signal to said first intermediate frequency signal, said third frequency conversion means receiving, as a frequency conversion signal, a first oscillation frequency signal from said first oscillator means.

5. A space diversity receiving system according to claim 4, wherein said phase detection means comprises:

(a) fourth frequency conversion means connected to receive the second output signal from the branching means in said first channel, for converting said second output signal to said first intermediate frequency signal, (b) a phase modulator for supplying a frequency conversion signal to said fourth frequency conversion means, said phase modulator receiving, as its input signal, a first oscillation frequency signal from said first oscillator means, (c) second combining means connected to receive the output of said fourth frequency conversion means and the second output signal from the branching means in said second channel, (d) a phase detector for providing an output signal to said control signal generator means, said phase detector being connected to receive the output signal from said second combining means, and (e) second oscillator means for providing second oscillation frequency signals to said phase modulator to modulate said first oscillation frequency signal and to said phase detector as a reference frequency to detect the modulating signal in the output of said second combining means.

6. A space diversity receiving system according to claim 5, further comprising first and second automatic gain control amplifiers for maintaining the respective inputs to said second combining means at a constant amplitude.

7. A space diversity receiving system according to claim 4, wherein said second channel further includes delay equalizer means connected to receive the first output signal from said branching means for compensating for the delay time caused by said phase variation means in said first channel.

8. A space diversity receiving system of the type wherein a plurality of received signals are combined in an in-phase relationship at an intermediate frequency, comprising:

(a) at least first and second channels, each of said first and second channels including a first frequency conversion means for converting a respective one of said received signals to an intermediate frequency signal and branching means connected to receive the signal from said first frequency conversion means for providing first and second output signals, said first channel further including phase variation means connected between said first frequency conversion means and said branching means for altering the phase of the output intermediate frequency signal from said first frequency conversion means, (b) first combining means connected to receive the first output signals of the branching means in each of said at least first and second channels for providing a first combined output signal, and (c) phase variation control means for controlling said phase variation means in said first channel, said phase variation control means including phase detection means connected to receive the second output signals of the branching means in each of said at least first and second channels for detecting the phase difference between said second output signals, and control signal generator means connected to said phase detection means and responsive to the output of the phase detection means for generating a control signal to said phase variation means to cause the signals at the inputs of said first combining means to be in-phase, wherein said phase variation means includes a variable phase shifter comprising:

(i) second branching means for branching the input to said variable phase shifter into first and second input signals, (ii) first and second phase shifter channels for receiving said first and second input signals, respectively, each of said first and second channels containing a 3-terminal circulator connected to receive a respective input signal at the first terminal thereof, and providing a respective output signal at the third terminal thereof, said second channel further containing a 90° fixed phase shifter for phase shifting the input to said 3-terminal circulator,

(iii) and second combining means for providing a variable phase shifter output, connected to receive the output signals from each of said circulator means, and (iv) control signal converter circuits connected to the second terminal of each said 3-terminal circulator, the impedance of said control signal converter circuits being varied in response to signals received from said control signal generator means.

9. A space diversity receiving system according to claim 8, wherein said control signal generator means comprises:

(a) a comparator connected to receive a signal from said phase detection means, said comparator having a variable-polarity direct current signal output, the polarity of said output being dependent upon the signal received from said phase detection means,
(b) a gate circuit,
(c) a clock pulse generator for providing clocking pulses to said gate circuit, said gate circuit emitting output pulses corresponding to each said clocking pulse having a polarity dependent on the polarity of the output of said comparator at the time of each corresponding clocking pulse,
(d) reversible counting means for counting the output pulses from said gate circuit, the direction of counting being dependent on the polarity of said output pulses, the output of said reversible counting means being a saw tooth wave signal having an amplitude dependent upon the total count accumulated by said reversible counting means during each respective period of said saw tooth wave signal,
(e) third branching means for branching out first and second counting signals, connected to receive the output from said reversible counting means, and
(f) first and second wave shifting means for converting said first and second counting signals, respective, into triangular wave control signals, said control signals being 90° out-of-phase with respect to each other and applied to said control signal converter circuits of said variable phase shifter.

* * * * *

UNITED STATES PATENT AND TRADEMARK OFFICE
CERTIFICATE OF CORRECTION

PATENT NO. : 4,079,318
DATED : March 14, 1978
INVENTOR(S) : Kyo KINOSHITA

It is certified that error appears in the above-identified patent and that said Letters Patent are hereby corrected as shown below:

Column 3, line 61 - after "can" insert -- eventually --

Column 6, lines 5 & 6 - after "digital signal" insert -- to an analog signal -- line 7 - delete "to an analog signal"

Column 7, line 6 - delete "Wherein" insert --wherein -- line 49 - after "power" insert -- , --

Signed and Sealed this

Nineteenth Day of December 1978

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,079,318

DATED : March 14, 1978

INVENTOR(S) : Kyo KINOSHITA

It is certified that error appears in the above-identified patent and that said Letters Patent are hereby corrected as shown below:

Column 2, line 23 - before "phase" delete -- output -- line 29 - after "outputs" insert -- , --

Column 4, line 11 - after "extended up" insert -- to -- line 29 - after "105b" insert -- , --

Column 5, line 61 - In the equation, delete " $\epsilon^{\delta\sigma}$ " insert -- $\epsilon^{\delta\theta}$ --

UNITED STATES PATENT AND TRADEMARK OFFICE
CERTIFICATE OF CORRECTION

PATENT NO. : 4,079,318
DATED : March 14, 1978
INVENTOR(S) : Kyo KINOSHITA

It is certified that error appears in the above-identified patent and that said Letters Patent are hereby corrected as shown below.

Column 6, line 37 - after "circuit" delete " , "

Column 7, line 25 - delete "saw-toth" insert -- saw-tooth -- line 32 - delete "comfining" insert -- combining -- line 46 - delete "contract" insert -- contrast -- line 55 - delete "comfined" insert -- combined -- line 55 - after "band" delete "ac-"

line 56 - delete "cording"

UNITED STATES PATENT AND TRADEMARK OFFICE
CERTIFICATE OF CORRECTION

PATENT NO. : 4,079,318
DATED : March 14, 1978
INVENTOR(S) : Kyo KINOSHITA

It is certified that error appears in the above-identified patent and that said Letters Patent are hereby corrected as shown below:

Column 8, line 31 - -after "105b" insert -- , -- line 34 - after "204b" delete " , "

line 44 - delete "output" insert -- outputs -- line 52 - after "essary" insert -- , -- line 62 - after "branching" insert -- amplifier --

Column 9, line 11 - delete "which" (second occurrence), insert -- such --.

line 21 - delete "shifters" insert -- shifter -- line 21 - after "is" and before the comma insert -- used -- line 36 - after "embodiments" delete " , "

UNITED STATES PATENT AND TRADEMARK OFFICE
CERTIFICATE OF CORRECTION

PATENT NO. : 4,079,318

DATED : March 14, 1978

INVENTOR(S) : Kyo Kinoshita

It is certified that error appears in the above-identified patent and that said Letters Patent are hereby corrected as shown below:

Column 9, line 49, after "A" insert -- space --

This certificate supersedes Certificate of Correction issued October 17, 1978.

Signed and Sealed this

Twenty-second Day of May 1979

[SEAL]

Attest:

RUTH C. MASON
Attesting Officer

DONALD W. BANNER
Commissioner of Patents and Trademarks